United States Patent
Zipplies

[11] Patent Number: 6,100,318
[45] Date of Patent: *Aug. 8, 2000

[54] FREE-FLOWING POLYTETRAFLUOROETHYLENE MOLDING POWDER

[75] Inventor: Tilman Zipplies, Burghausen, Germany

[73] Assignee: Dyneon GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,984

[22] Filed: Jan. 9, 1997

Related U.S. Application Data

[63] Continuation of application No. 08/546,229, Oct. 20, 1995, abandoned.

[30] Foreign Application Priority Data

Oct. 21, 1994 [DE] Germany .......................... P 44 37 685

[51] Int. Cl.⁷ ....................................................... C08L 5/33
[52] U.S. Cl. .......................... 524/236; 523/334; 524/259; 524/544; 524/545; 524/546; 524/714

[58] Field of Search .............................. 523/334; 524/236, 524/544, 546, 545, 714, 259

[56] References Cited

U.S. PATENT DOCUMENTS

| | | | |
|---|---|---|---|
| 3,882,217 | 5/1975 | Banham et al. | 264/117 |
| 5,216,068 | 6/1993 | Zipplies | 524/546 |
| 5,219,910 | 6/1993 | Stahl et al. | 524/236 |

FOREIGN PATENT DOCUMENTS 1076642  7/1967  United Kingdom .

*Primary Examiner*—Peter D. Mulcahy
*Attorney, Agent, or Firm*—Connolly, Bove, Lodge & Hutz LLP

[57] ABSTRACT

Free-flowing polytetrafluoroethylene molding powders are obtained if a finely divided non free-flowing powder of an optionally modified polytetrafluoroethylene is agglomerated in an aqueous medium which contains a trialkylamine oxide and the agglomerates are dried.

12 Claims, No Drawings

FREE-FLOWING POLYTETRAFLUOROETHYLENE MOLDING POWDER

This application is a continuation of Ser. No. 08/546,229, filed Oct. 20, 1995, now abandoned.

The invention relates to free-flowing molding powders comprising at least one optionally modified suspension polytetrafluoroethylene, an active amount of at least one trialkylamine oxide and if appropriate one or more fillers, to a process for their manufacture and their use for making sintered articles.

A distinction is made between two types of polymers of tetrafluoroethylene (TFE), namely between thermoplastics which can be processed from the melt and types which are not processable from the melt, primarily the homopolymer, i.e. polytetrafluoroethylene (PTFE) itself, but in addition also the so-called "modified" TFE polymers which comprise (one) other comonomer(s) in such a small amount—usually $\leq 2$ mol %, preferably $\leq 0.5$ mol %—that the characteristic of being "not processable from the melt" is retained. Such comonomers are, for example, chlorotrifluoroethylene, hexafluoroisobutylene, 1-perfluorobutene, perfluoroalkyl perfluorovinyl ethers with a perfluoroalkyl radical having 1 to 5 carbon atoms, in particular perfluoropropylperfluorovinyl ether, and hexafluoropropylene. The invention relates to such types which are not processable from the melt. They have an apparent melt viscosity of at least $1 \times 10^8$ Pas at 380° C., measured by the creep test [Ajroldi et al., J. Appl. Polym. Sci., 14 (1970), page 79 et seq.].

Those TFE polymers which are not processable from the melt and are obtained by the suspension polymerization process are used for molding powders. At most, small amounts of dispersing agents are employed in this process, and the polymerization is carried out with intensive thorough mixing. The polymer obtained by this process, which has an average particle size of about 800 to 1200 μm or more as the crude polymer is subjected to one of the known comminution processes for PTFE—for example grinding in a hammer mill or wet cutting—and is thereby finely divided down to an average particle size of 20 to 100 μm. The fillers employed should likewise be in finely divided form, i.e. should have approximately the average particle size of the ground polymer.

The mixture thus obtained has poor processing properties and is therefore agglomerated. The customary agglomeration process is known to the expert, for example from U.S. Pat. No. 3,527,857 and 3,781,258. In this process, the polymer powder, which has been premixed with the fillers, is suspended in a liquid agglomerating medium comprising water and an organic liquid, and this organic liquid must be capable of wetting the polymer powder and furthermore is soluble in water at most up to the extent of 15% by weight, preferably up to the extent of 3% by weight.

A great problem in the production of shaped articles from such agglomerates lies in discoloration. Since TFE polymers are expensive, high requirements are also imposed on the quality of the shaped articles produced therefrom. U.S. Pat. No. 3,882,217 thus relates to a process for the preparation of a free-flowing PTFE molding powder, provided with fillers if appropriate, by agitation of a finely divided PTFE powder, which comprises a filler if appropriate, with a water-containing medium for the purpose of agglomeration, and drying of the mixture containing agglomerated particles, which comprises wetting the finely divided PTFE powder with an aqueous solution of a volatile nonionic surface-active agent, the concentration of the surface-active agent being at least 40 times the critical micelle concentration at 20° C. These volatile nonionic surface-active agents—condensates of ethylene oxide and alkylphenols or long-chain alcohols are mentioned as being particularly suitable—have the effect of a considerable improvement in the discoloration.

It has now been found that the discoloration can be suppressed considerably more with certain volatile surface-active agents having a zwitter-ionic character, that is to say trialkylamine oxides, than with the known oxyethylates.

Trialkylamine oxides are known surface-active agents. They are usually prepared by oxidation of the corresponding tertiary amines in aqueous hydrogen peroxide solutions (U.S. Pat. No. 3,215,741 and 3,283,007). They are employed, for example, as an emulsifier for aqueous dispersions for textile treatment (EP-A 471 416), as a fiber processing agent (EP-A 229 340) or as a dispersing agent for impregnation of yarns and textile sheet-like structures, and also as a dispersing agent for concentration of fluorine polymer dispersions (U.S. Pat. No. 5,219,910).

Preferred amine oxides are those of the formula

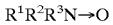

$$R^1R^2R^3N \rightarrow O$$

in which $R^1$ is an alkyl radical having 6 to 22 carbon atoms or a mixture of such alkyl radicals, $R^2$ has the meaning of $R^1$ or is an alkyl radical having 1 to 4 carbon atoms and $R^3$ is an alkyl radical having 1 to 4 carbon atoms. $R^2$ and $R^3$ are preferably methyl groups.

The amine oxides employed according to the invention are much more volatile than the oxyethylates employed to date, which decompose when heated in air to form undesirable volatile and solid degradation products, it being possible for the volatile products to be deposited on the cooler surfaces of the waste air passages. In contrast, the amine oxides give only highly volatile, non-toxic decomposition products.

Another advantage of the use of the amine oxides is the lower use concentration, which is from 0.1 to 2% by weight, based on the polymer and, if appropriate, filler. In general, up to 1% by weight of amine oxide, preferably 0.2 to 0.5% by weight, is sufficient.

A particular advantage of the invention is that because of the higher volatility of the amine oxides, they can be removed from the shaped articles even during drying at temperatures of up to about 150° C. The removal of the volatile constituents at this lower temperature is very much less expensive in terms of apparatus than the corresponding removal in the course of sintering. The removal of the amine oxides at low temperatures is advantageous above all if a softer grain of the molding powder and improved mechanical properties of the sintered compacts are required.

A decisive advantage of the invention is that the discoloration of the shaped articles during sintering is further considerably improved compared with the prior art.

If the molding powder according to the invention comprises fillers, possible fillers are the customary products, above all carbon black, graphite, carbon powder, mica, talc, glass in the form of powder, fibers, beads or hollow beads, silicon dioxide, for example in the form of quartz, silicates, metal oxides and double oxides, such as iron oxide, cobalt oxide, chromium oxide, aluminum oxide, titanium oxide, antimony trioxide, lead oxide, cobalt blue, ultramarine, organic pigments, such as benzidine dyestuffs or phthalocyanine dyestuffs, salt-like substances, such as potassium titanate or barium titanate, and furthermore also metals in the form of flocs, flakes or powders, such as bronze, copper, aluminum or brass, as well as synthetic fibers of plastics of high heat stability, such as, for example, polyimide fibers or aramid fibers.

The weight content of filler, based on the sum of polymer and filler, is up to 75% by weight, preferably 5 to 70% by weight, in particular 15 to 60% by weight.

The molding powders according to the invention can be prepared by methods which are known per se, for example by the process of U.S. Pat. No. 3,882,217.

Preferred is a process for the preparation of a free-flowing molding powder, which comprises agglomerating a finely divided non free-flowing powder of at least one optionally modified polytetrafluoroethylene in an aqueous medium which contains at least one trialkylamine oxide, and drying the agglomerates.

The invention is illustrated in more detail in the following examples.

EXAMPLE 1

1.5 kg of finely divided suspension PTFE ($d_{50}$ 20 to 30 $\mu$m) are mixed with 500 g of finely divided coal ($d_{50}$ 20 to 30 $\mu$m) in a fluid mixer. 900 g of a 0.5% strength by weight solution of lauryldimethylamine oxide are added to the homogeneous mixture formed, which is not free-flowing, and the components are mixed intensively. The resulting moist powder is subjected to a rolling treatment and dried at 180° C. for 12 hours. The cooled product is then freed from coarse and fine material by sieving. The resulting agglomerates have an average particle diameter of 700 $\mu$m, a bulk density of 600 g/l and good free-flowing properties.

The properties of the molding powder can be varied within certain limits by the nature and duration of the rolling treatment.

EXAMPLE 2

1.5 kg of finely divided suspension PTFE ($d_{50}$ 20 to 30 $\mu$m) are mixed with 500 g of ground glass fibers ($d_{50}$ 30 to 50 $\mu$m) in a fluid mixer. 800 g of a 0.5% strength by weight solution of lauryldimethylamine oxide are added to the mixture formed, which is not free-flowing, and the components are mixed intensively. The resulting moist powder is subjected to a rolling treatment and dried at 280° C. for 12 hours. The cooled product is then freed from coarse and fine material by sieving. The resulting agglomerates have an average particle diameter of 750 $\mu$m, a bulk density of 650 g/l and good free-flowing properties.

EXAMPLE 3

1.7 kg of finely divided suspension PTFE ($d_{50}$ 20 to 30 $\mu$m) are mixed with 300 g of finely divided graphite ($d_{50}$ 30 $\mu$m) in a fluid mixer. 900 g of a 0.5% strength by weight solution of cetyl-dimethylamine oxide are added to the mixture formed, which is not free-flowing, and the components are mixed intensively. The resulting moist powder is subjected to a rolling treatment and dried at 280° C. for 12 hours. The cooled product is then freed from coarse and fine material by sieving. The resulting agglomerates have an average particle diameter of 790 $\mu$m, a bulk density of 600 g/l and good free-flowing properties.

EXAMPLE 4

0.8 kg of finely divided suspension PTFE ($d_{50}$ 20 to 30 $\mu$m) are mixed with 1.2 kg of fine bronze powder ($d_{50}$ 30 to 50 $\mu$m) in a fluid mixer. 800 g of a 0.5% strength by weight solution of cetyl-dimethylamine oxide are added to the mixture formed, which is not free-flowing, and the components are mixed intensively. The resulting moist powder is subjected to a rolling treatment and dried at 280° C. for 12 hours. The cooled product is then freed from coarse and fine material by sieving. The resulting agglomerates have an average particle diameter of 750 $\mu$m, a bulk density of 1100 g/l and good free-flowing properties.

I claim:

1. A process for the preparation of a free flowing molding powder, consisting essentially of:

mixing powdered solids comprising a non free-flowing, suspension-polymerized, non-melt-processable, finely-divided tetrafluoroethylene polymer, with an aqueous medium containing at least one volatilizable trialkylamine oxide, said trialkylamine oxide being present in an amount of 0.1 to 2% by weight, based on the weight of the solids, to obtain moist agglomerates of powdered solids containing said trialkylamine oxide, and drying the moist, powdered solids to obtain free-flowing powder which comprises the resulting tetrafluoroethylene polymer agglomerates, said free-flowing powder having an average particle size greater than 20 $\mu$m.

2. The process as claimed in claim 1, wherein said powdered solids comprise said tetrafluoroethylene polymer and a filler, the percentage amount of volatilizable trialkylamine oxide in said free-flowing powder being based upon the weight of tetrafluoroethylene polymer and the filler.

3. The process as claimed in claim 1, wherein the suspension-polymerized, non-melt-processable tetrafluoroethylene polymer is a copolymer containing a first monomer and one or more second monomers, the first monomer being tetrafluoroethylene; the amount of second monomer being not more than about 2 mol-% of said copolymer.

4. The process as claimed in claim 1, wherein the suspension-polymerized, non-melt-processable tetrafluoroethylene polymer is a copolymer containing not more than about 2 mol-% of comonomer other than tetrafluoroethylene.

5. The process as claimed in claim 2, wherein the free-flowing powder comprises 0.2 to 1% by weight of said trialkylamine oxide and 5 to 70% by weight of filler, said percentages being based upon the weight of polymer and filler.

6. The process as claimed in claim 5, wherein essentially the balance of said free-flowing powder consists essentially of said tetrafluoroethylene polymer.

7. The process as claimed in claim 1, wherein said trialkylamine oxide corresponds to the formula

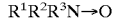

in which $R^1$ is an alkyl radical having 6 to 22 carbon atoms or a mixture of such alkyl radicals, $R^2$ has the meaning of $R^1$ or is an alkyl radical having 1 to 4 carbon atoms and $R^3$ is an alkyl radical having 1 to 4 carbon atoms.

8. The process as claimed in claim 1, wherein said trialkylamine oxide is volatilizable below the sintering temperature of said free-flowing powder.

9. The process as claimed in claim 1, wherein said trialkylamine oxide is volatilizable at or below 150° C.

10. The process as claimed in claim 1, wherein said free-flowing powder is sieved after said drying step.

11. The process as claimed in claim 1, wherein said aqueous medium consists essentially of said volatilizable trialkylamine oxide and water.

12. The process as claimed in claim 2, wherein said aqueous medium consists essentially of said volatilizable trialkylamine oxide and water.

* * * * *